United States Patent [19]

Keyser

[11] 3,820,572
[45] June 28, 1974

[54] PIPE STRUCTURE
[75] Inventor: Lewis R. Keyser, Dayton, Ohio
[73] Assignee: Price Brothers Company, Dayton, Ohio
[22] Filed: Jan. 20, 1972
[21] Appl. No.: 219,301

[52] U.S. Cl. ............................. 138/106, 138/105
[51] Int. Cl. ......................................... F16l 3/00
[58] Field of Search ........... 138/106, 105, 103, 175, 138/176, 153; 61/43; 166/285; 285/288; 52/170, 297, 253, 587

[56] References Cited
UNITED STATES PATENTS
912,318  2/1909  McMahon .................... 138/175
1,086,779  2/1914  Miller .......................... 138/105
1,722,369  7/1929  DeLaMare ................... 138/105
2,080,999  5/1937  Cooney ........................ 138/175
2,959,197  11/1960  Eggink ........................... 61/43
R22,988  3/1948  McLeish ...................... 138/105

Primary Examiner—William I. Price
Assistant Examiner—Steven M. Pollard
Attorney, Agent, or Firm—Biebel, French & Bugg

[57] ABSTRACT

An underground pipe structure which includes an anchor for resisting longitudinal movement of the pipe line in response, principally, to thrust forces generated by hydrostatic pressure at elbows, reducers, valves and bulkheads.

18 Claims, 5 Drawing Figures

PATENTED JUN 28 1974  3,820,572

3,820,572

PIPE STRUCTURE

BACKGROUND OF THE INVENTION

Underground pipe lines are often subjected to forces which tend to result in undesirable, longitudinal movement of the pipe sections. For example, expansion and contraction caused by temperature changes will tend to shift underground pipe sections longitudinal thereof to a significant degree when the material of which the pipes are constructed has a relatively high coefficient of linear thermal expansion. U.S. Pat. Nos. Re. 22,988; 2,997,071; and 3,168,114 discuss this problem and disclose various anchors intended to resist displacing forces of this type. Additionally, where a pipe line is laid downwardly along a relatively steep grade its weight will tend to cause longitudinal movement of the pipe sections thereof.

A relatively more serious problem exists where the pipes contain elbows for changing grade or course and fluids under relatively high pressure are being accomodated in the pipe line. In such cases the elbows of the pipe line must resist thrust forces in a direction perpendicular to the chord of the elbow which may easily be in excess of one half million pounds. Similarly, thrust forces which may be of comparable magnitude may be generated at reducers, valves and bulkheads.

Elbows have two sources of natural resistance to thrust forces of this type. Thus, the frictional drag of the weight of the elbow against the earth surrounding the elbow and the passive resistance of the soil against the back of the elbow will tend to prevent movement thereof. Bulkheads obtain some resistance by bearing on adjacent soil, while valves and reducers have some degree of frictional resistance. However, these natural sources of resistance are often insufficient to counteract the thrust forces and must be supplemented in other ways.

One manner of accomplishing this is to, in effect, increase the area of the back of the elbow or bulkhead by pouring a large concrete thrust block behind it to distribute the thrust over a larger soil area. Occasionally, however, this technique is unavailable where, for example, an obstruction at the back of the elbow or bulkhead prevents the pouring of a standard thrust block at this point.

Where the thrust forces are not too great this problem can also be overcome by casting raised coating anchors on the surface of the pipe and then casting a block about the pipe between the raised coating anchors to increase the resistance of the pipe line upstream and downstream of the elbow to movement in response to thrust forces generated at the elbow. In the case of bulkheads, the pipe section immediately upstream may be provided with an anchor of this type, while reducers and valves may be anchored by anchoring the pipe section immediately downstream thereof. Where relatively high pressures are encountered or relatively large diameter pipe is to be used, however, this type of anchor will often be insuffient since, generally speaking, only one of the raised coating anchors is effective to resist thrust forces.

SUMMARY OF THE INVENTION

In accordance with the present invention a pipe line is anchored against movement caused by such things as thrust forces generated at pipe line elbows, reducers, valves, bulkheads, etc., by casting a pair of annularly shaped, raised areas on the exterior surface of pipe sections, such as those positioned upstream and downstream of an elbow, with one or more sheets of wire mesh bridging the space between the two raised areas on the pipe section. A concrete anchor block is then cast about the selected pipe section, embedding the wire mesh bridging these areas. As a result, thrust forces are transferred to the concrete anchor block by both raised coating areas rather than just one of these areas, as in the prior art anchors. The embedded wire mesh, therefore, distributes the thrust load between a pushing force on one raised area and a pulling force on the other raised area, approximately doubling the effectiveness of the anchor.

DESCRIPTION OF THE PREFERRED EMBODIMENTS

Figure 1:
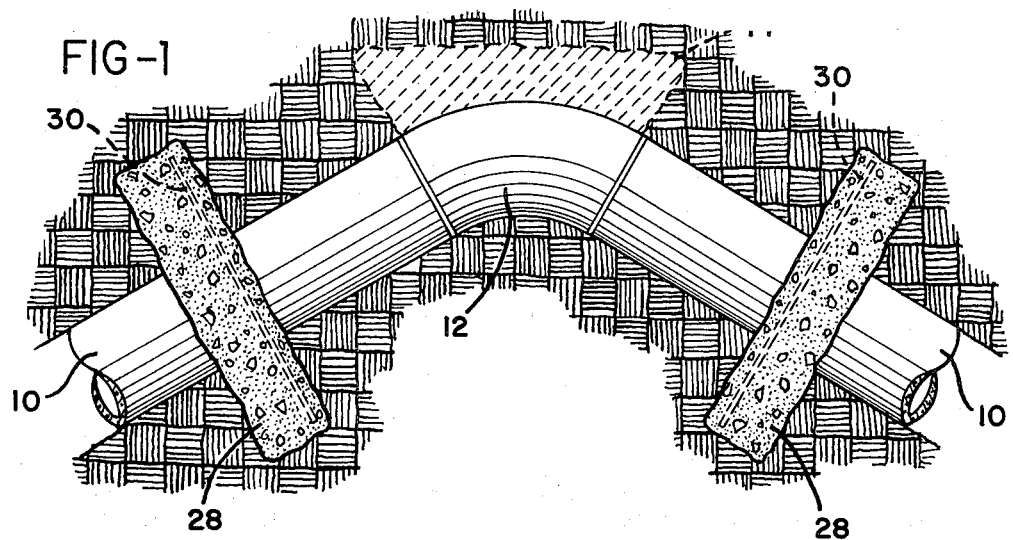
FIG. 1 is a view of an underground pipe line, partly in section, depicting a typical use of the present invention.

As noted above, anchors in accordance with the present invention find application in a variety of installations, such as at elbows, bulkheads, reducers, valves, etc. For purposes of illustration one of these applications will be described, and similar applications will be readily apparent. Thus, FIG. 1 depicts a typical installation incorporating the anchor of the present invention and it will be seen that this includes a pair of conduits, such as the pipe sections 10, acutely angularly disposed with respect to each other and with their adjacent ends interconnected by an elbow 12. The pipe sections and elbow 12 will typically be installed underground and the elbow will be used to change the grade or course of the pipe line.

In order to resist the high thrust forces generated at the elbow, where the natural resistance forces are insufficient, it is common practice to case a thrust block, as shown in dotted lines at 14, to, in effect, increase the area of the back of the elbow. If for some reason, however, it is impossible or impractical to cast a thrust block at this point, the thrust forces may be overcome by anchoring each of the conduits or pipe sections 10 immediately upstream and downstream of the elbow.

This is accomplished in accordance with the present invention by casting an improved anchor on the exterior surface of each of the pipe sections to be used immediately upstream and downstream of the elbow and then casting an anchor block about each of these pipe sections.

Figure 2:
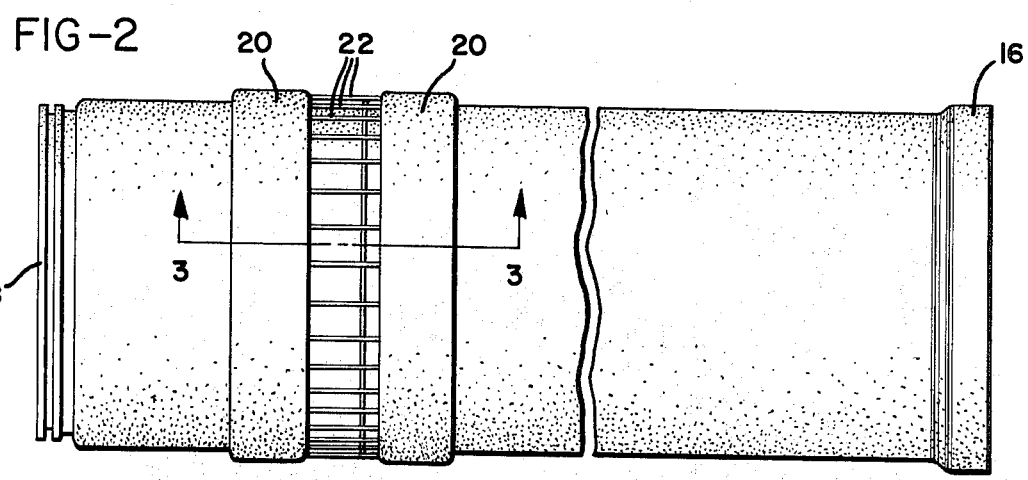
FIG. 2 is a view of a pipe section incorporating the present invention.
Figure 3:
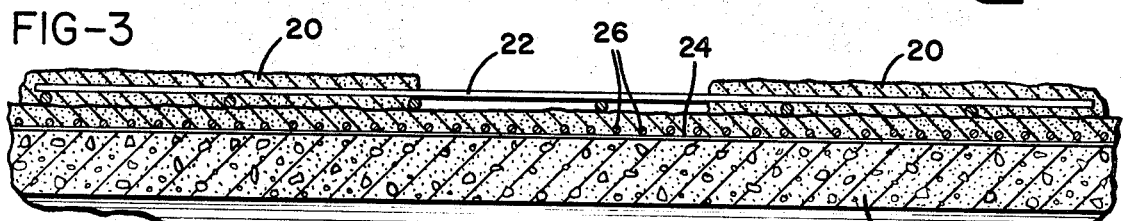
FIG. 3 is an enlarged, cross-sectional view taken along line 3—3 of FIG. 2.

Thus, as seen in FIG. 2, a pipe section 10, which may otherwise be of conventional construction and include a bell end 16 and spigot end 18, is provided with a pair of raised, annularly shaped areas 20 formed on the exterior surface of the pipe at points spaced longitudinally thereof. A sheet of wire mesh 22 extends between the two raised areas and has portions embedded in each and another portion bridging the two areas, as best seen in FIG. 3 of the drawings. Typically, the pipe sections will be of the prestressed concrete type including a steel cylinder 24 and prestressing wire 26 and the two raised areas 20 may be formed conveniently as layers of cement mortar coating applied during the pipe manufacturing process.

Figure 4:
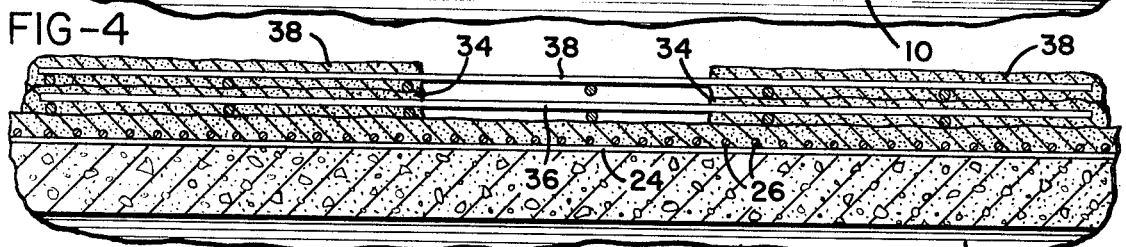
FIG. 4 is a view similar to FIG. 3 but showing a second preferred embodiment of the invention.
Figure 5:
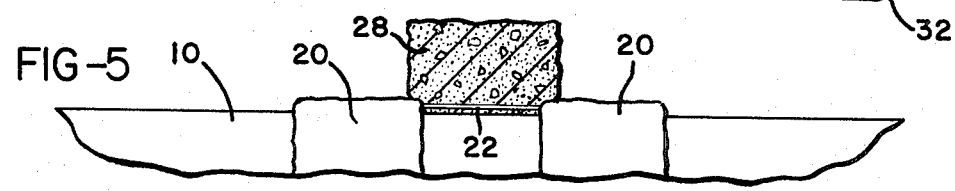
FIG. 5 is an enlarged view, with parts in section, of a portion of an installed pipe section incorporating the present invention.

When the pipe sections 10 shown in FIG. 2 of the drawings are positioned in the manner shown in FIG. 1 of the drawings, concrete anchor blocks 28, provided with suitable reenforcing, as at 30, are cast about each of the sections 10, embedding the raised areas 20 and the wire mesh 22 therein. Thus, the thrust forces generated at the elbow are taken up by the two pipe sections anchored in place just upstream and downstream of the elbow.

Where additional securement against movement is necessary additional layers of wire mesh can be utilized by building up the two raised areas in the manner shown in FIG. 4 of the drawings. Thus, as seen in FIG. 4 a conduit 32 is provided initially with a pair of spaced, annularly shaped raised areas 34 having a sheet of wire mesh embedded therein in encircling relationship to the exterior surface of the conduit 32. Thereafter, a second pair of annularly shaped raised areas 38 are cast, embedding therein a second sheet of wire mesh 40 which encircles the conduit 32 in spaced relationship to the first layer 36.

From the above it will be seen that the present invention provides means for resisting thrust forces generated in large diameters of high pressure pipe lines where natural resistance forces are insufficient or the use of thrust blocks is impractical or impossible.

As noted above the wire mesh, whether in one layer or a plurality of layers, transfers the anchoring forces to both of the raised coating areas on the anchored pipe section. Thus, the thrust forces are, in effect, divided between a pulling force exerted on one coating area and a pushing force exerted on the other coating area, thereby substantially doubling the effectiveness of the anchor over prior art structures of this general type.

While the form of apparatus herein described constitute preferred embodiments of the invention, it is to be understood that the invention is not limited to these precise forms of apparatus, and that changes may be made therein without departing from the scope of the invention.

What is claimed is:

1. Pipe structure adapted to resist thrust forces acting substantially longitudinally thereof comprising:
   a. an elongated preformed, unitary, tubular conduit,
   b. means defining a first raised area formed integrally with said conduit and projecting outwardly from the outer surface thereof,
   c. means defining a second raised area formed integrally with said conduit and projecting outwardly from said outer surface thereof,
   d. said first and second raised areas being spaced from each other longitudinally of said conduit, and
   e. discontinuous means attached to each of said raised areas and bridging the space therebetween in spaced relationship to said outer surface of said conduit,
   f. whereby an anchor block may be cast about said pipe with said discontinuous means embedded in said anchor block to transfer thrust forces experienced by said conduit from said raised areas to said anchor block.

2. The structure of claim 1 wherein:
   a. each of said raised areas constitute an annular band encircling said outer surface of said pipe.

3. The structure of claim 1 wherein:
   a. said conduit is formed from a castable material,
   b. said raised areas are formed of said same material as said conduit, and
   c. said discontinuous means is cast in said raised areas.

4. The structure of claim 1 wherein:
   a. said discontinuous means comprises wire mesh.

5. The structure of claim 1 further comprising:
   a. second discontinuous means extending from said first to said second raised area and bridging the space therebetween in space relation to said first named discontinuous means.

6. Pipe structure adapted to resist thrust forces acting substantially longitudinally thereof comprising:
   a. an elongated, precast concrete, tubular conduit of unitary construction,
   b. a pair of annularly shaped raised areas of concrete formed integrally with and projecting outwardly from the outer surface of said conduit at points thereon spaced longitudinally of said conduit from each other, and
   c. a sheet of wire mesh encircling said conduit in spaced relation to the outer surface thereof with portions thereof embedded in said raised areas.

7. The structure of claim 6 further comprising:
   a. a second sheet of wire mesh encircling said conduit in spaced relation to said first named sheet of wire mesh with portions of said second sheet of wire mesh embedded in said raised areas.

8. Pipe structure adapted to resist thrust forces acting substantially longitudinally thereof comprising:
   a. an elongated preformed, unitary, tubular conduit,
   b. means defining first and second raised areas formed integrally with said conduit on an exterior surface thereof at longitudinally spaced points thereon,
   c. discontinuous means extending between said raised areas and bridging the space therebetween in spaced relation to said exterior surface, and
   d. an anchor block of castable material cast about said conduit, embedding said raised areas and said discontinuous means therein and projecting radially outwardly from said conduit.

9. The structure of claim 8 wherein:
   a. said conduit and said raised areas are formed of a castable material and said discontinuous means is embedded in said raised areas.

10. The structure of claim 8 wherein:
    a. said discontinuous means comprises a sheet of wire mesh.

11. Pipe structure adapted to resist thrust forces acting substantially longitudinally thereof comprising:
    a. an elongated, precast concrete, tubular conduit of unitary construction,
    b. a pair of annularly shaped raised areas of concrete formed integrally with said conduit on an exterior surface thereof at longitudinally spaced points therealong, c. a sheet of wire mesh encircling said conduit in spaced relation to said exterior surface thereof with portions embedded in said raised areas and another portion spanning the space between said raised areas, and d. an anchor block of concrete cast about said conduit and embedding therein said raised areas and said portion of said wire mesh spanning the space between said raised areas.

12. The pipe structure of claim 11 further comprising:

a. a second sheet of wire mesh encircling said conduit in spaced relation to said first named sheet of wire mesh and having portions thereof embedded in said raised areas.

13. Pipe structure adapted to resist thrust forces acting substantially longitudinally thereof comprising:

a. a pair of elongated, preformed, tubular conduits each of unitary construction, b. an elbow joining adjacent ends of said conduits with said conduits acutely angularly disposed with respect to each other, c. each of said conduits having a pair of raised areas formed integrally therewith on the outer surface thereof at points spaced longitudinally thereof, d. discontinuous means extending between said raised areas on each of said conduits in spaced relation to said outer surface thereof, and e. a block of castable material cast about each of said conduits embedding said raised areas and said discontinuous means therein.

14. The structure of claim 13 wherein:

a. said conduits and said raised areas are formed of a castable material, and b. said discontinuous means has portions embedded in said raised areas.

15. The structure of claim 14 wherein:

a. said raised areas and said conduits are formed of concrete.

16. The structure of claim 13 wherein:

a. said discontinuous means comprises a sheet of wire mesh.

17. The structure of claim 13 further comprising:

a. second discontinuous means extending between said raised areas in spaced relation to said first named discontinuous means.

18. Pipe structure adapted to resist thrust forces acting substantially longitudinally thereof comprising:

a. a pair of elongated precast concrete conduits of unitary construction acutely angularly disposed with respect to each other with adjacent ends thereof spaced from each other, b. an elbow interconnecting said adjacent ends of said conduits, c. a pair of annularly shaped, raised concrete areas formed integrally with and on an exterior surface of each of said conduits at longitudinally spaced points therealong, d. a sheet of wire mesh encircling each of said conduits and having portions embedded in said raised areas, and e. a concrete block cast about each of said conduits, embedding said raised areas of said wire mesh therein to prevent longitudinal movement of said conduits upon fluid flow therethrough and through said elbow.

* * * * *